May 8, 1923.
F. A. QUINTAL
1,454,689
FISHHOOK
Filed Sept. 19, 1922
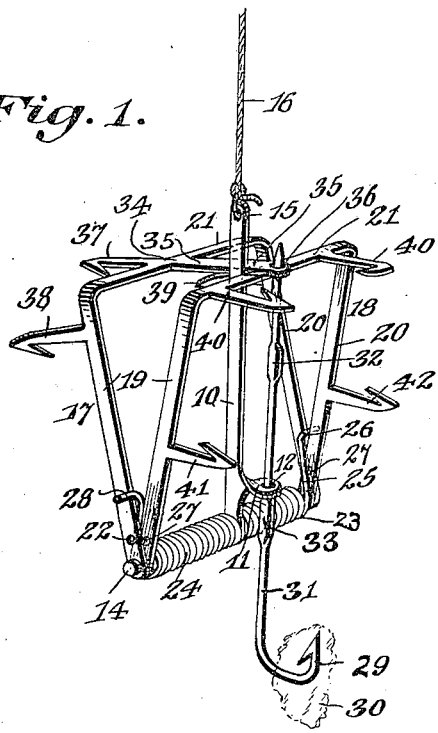
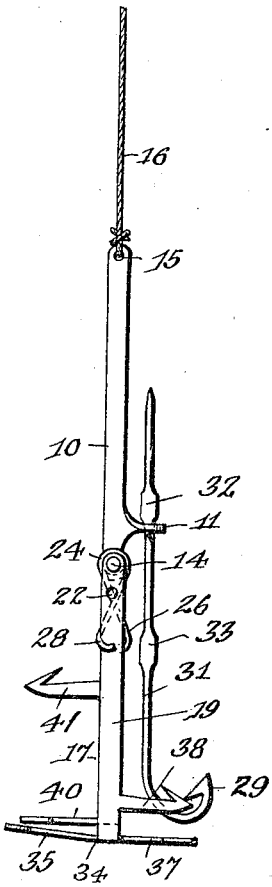
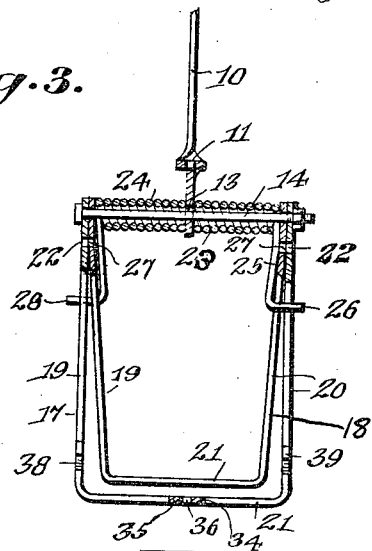
Freeman A. Quintal, INVENTOR.
BY Geo. P. Kimmel, ATTORNEY.

Patented May 8, 1923.

1,454,689

UNITED STATES PATENT OFFICE.

FREEMAN A. QUINTAL, OF HOLYOKE, COLORADO.

FISHHOOK.

Application filed September 19, 1922. Serial No. 589,118.

*To all whom it may concern:*

Be it known that I, FREEMAN A. QUINTAL, a citizen of the United States, residing at Holyoke, in the county of Phillips and State of Colorado, have invented certain new and useful Improvements in Fishhooks, of which the following is a specification.

This invention relates to fishing hooks, and has for its object to provide, a hook of such a class, in the manner as hereinafter set forth, with means automatically operated when the fish attacks the bait for grappling or snaring the fish and holding the same captive, but it is to be furthermore understood that the hook can be employed for any purposes wherein it is found applicable, by way of example grappling or snaring small animals that attempt to remove the bait.

Further objects of the invention are to provide a hook for the purpose set forth, which is simple in its construction and arrangement; automatic in its operation, strong, durable, efficient in its use, readily assembled and comparatively inexpensive.

With the foregoing and other objects in view, the invention consists in the novel construction, combination and arrangement of parts, as hereinafter more specifically described and illustrated in the accompanying drawings wherein is shown an embodiment of the invention, but it is to be understood that changes, variations and modifications can be resorted to which come within the scope of the claims hereunto appended.

In the drawings, wherein like reference characters denote corresponding parts throughout the several views:—

Fig. 1 is a perspective view of the hook when set.

Fig. 2 is a side elevation of the hook when swung, or released.

Fig. 3 is a sectional elevation of the hook when swung or released.

Referring to the drawings in detail, 10 denotes a supporting element, which is formed from an elongated flat bar, provided near its lower end with a laterally extending torsionally twisted stop lug 11, which is formed with a vertically disposed aperture 12. The lower end of the supporting element 10, is formed with an opening 13, through which extends a shaft 14. The upper end of the supporting element 10, has an opening 15 through which is secured the line 16.

The hook includes a pair of oppositely disposed grappling or snaring members and each of which is referred to generally by the reference characters 17, 18 respectively. The member 18 is arranged within the member 17, and each of said members is formed of an inverted yoke-shaped body portion with the legs thereof indicated at 19, 20 and the top at 21. Each of the legs 19, 20, has its lower portions provided with a plurality of apertures 22, for the purpose of adjustably mounting the members 17, 18 on the shaft 14. Mounted on the shaft 14 and interposed between the element 10 and the leg 20 of the member 18 is a coiled spring 23, and mounted on the shaft 14, and interposed between the element 10 and the leg 19, of the member 18 is a coiled spring 24.

The outer end of the coiled spring 23 is extended as at 25, and formed with an angular terminus 26, which abuts against the leg 20 of the member 18. The outer end of the spring 24, is extended as at 27, and formed with an angular terminus 28, which abuts against the leg 19 of the member 17. The normal tendency of the springs 23, 24, is to project the members 17, 18, toward each other when the hook is set. This action is had through the means of the angular portions 26, 28 of the ends 25, 27 bearing against the leg 20 of the member 18 and the leg 19 of the member 17.

Supported by the element 10, is a vertically disposed fish hook which comprises a bill 29, on which is mounted the bait 30 and further includes a vertically disposed elongated shank 31, which extends through the opening 12, of the stop lug 11. To prevent the separation of the fish hook from the supporting element 10, the shank 31 of the fish hook is upset as at 32, 33, to provide enlarged spaced portions which coact with the lug 11, to arrest vertical movement in either direction of the fish hook but at the same time the distance between the enlarged portions 32 and 33 is such, as to permit the shifting of a fish hook for a certain distance with respect to the supporting element 10.

The top 21 of the member 17, has formed integral therewith, as at 34, a setting arm 35, which is adapted to project over the top 21 of the member 18, so as to be engaged by the upper portion of the shank 31, for the purpose of maintaining the members 17, 18 locked together or in setting position. The free end of the arm 35, is formed with an opening 36, for the passage of the upper end of the shank 31, so that when the upper end of the shank is in such position, the members 17, 18 will be locked or readily retained in setting position as clearly illustrated in Fig. 1.

The top 21 of the member 17, centrally thereof is formed with an outwardly projecting grapple or snare 37, and the leg 19, as well as the leg 20, of the member 17, in proximity to the top 21, is formed with an outwardly projecting grapple or snare and the said grapples or snares carried by the legs 19, 20, of the member 17 are indicated at 38, 39. The top 21 of the member 18 is formed with a pair of outwardly projecting grapples or snares 40, and the arm 19, as well as the arm 20 of the member 18 at the lower portion thereof is formed with an outwardly extending snare or grapple, and these snares or grapples are indicated at 41, 42.

The hooked outer ends of the grapples or snares 38, 39, of the member 17, are disposed downwardly, and the hooked outer ends of the grapples or snares 41, 42 of the member 18, are disposed upwardly. The hooked outer ends of the snares or grapples 40 of the member 18 are disposed toward each other.

When the fish attempt to remove the bait 30, from the fish hook, the latter will be shifted in a direction away from the supporting element 10, under such condition separating the shank 31 from the arm 35, whereupon the members 17, 18 will be released and through the action of the springs 23, 24, they will be swung downwardly and grapple or snare the fish and hold the same captive.

It is to be understood that the style of fish hook can be varied, and that the members 17 and 18 can be provided with as many grapples or snares as is desired, and further that various changes in the form and details of the elements may be resorted to without departing from the spirit of the invention, as well as constructing the members 17 and 18 of any suitable material for the purpose intended.

What I claim is:—

1. A device for the purpose set forth comprising a supporting element having a laterally extending stop lug, a pair of oppositely disposed and spring controlled shiftable grappling or snaring members pivotally supported from the lower end of said element, a locking arm carried by one of said members and adapted to project over the other, and a lengthwise shiftable fish hook extending through said lug and one end of said arm when extended for locking said members against the controlling action of their springs until the hook is shifted clear of said arm.

2. A device for the purpose set forth comprising a supporting element having a laterally extending stop lug, a pair of oppositely disposed and spring controlled shiftable grappling or snaring members pivotally supported from the lower end of said element, a locking arm carried by one of said members and adapted to project over the other, and a lengthwise shiftable fish hook extending through said lug and one end of said arm when extended for locking said members against the controlling action of their springs until the hook is shifted clear of said arm, said hook having spaced enlargements engaging with said lug to limit vertical movement of the hook in either direction with respect to said element.

3. A device for the purpose set forth comprising a supporting element provided with a laterally extending apertured lug near its lower end, a shaft supported at the lower end of said element, a pair of oppositely disposed yoke-shaped members pivotally mounted on said shaft, lateral grapples or snares projecting from each of said members, coiled springs carried by the shaft and each engaging one of said members, a locking arm carried by one of said members and adapted to project over the other of said members, and a lengthwise shiftable fish hook extending through said lug and one end of said arm when projected for locking said members against the action of said springs until the hook is shifted clear of said arm.

4. A device for the purpose set forth comprising a supporting element provided with a laterally extending apertured lug near its lower end, a shaft supported at the lower end of said element, a pair of oppositely disposed yoke-shaped members pivotally mounted on said shaft, lateral grapples or snares projecting from each of said members, coiled springs carried by the shaft and each engaging one of said members, a locking arm carried by one of said members and adapted to project over the other of said members, and a lengthwise shiftable fish hook extending through said lug and one end of said arm when projected for locking said members against the action of said springs until the hook is shifted clear of said arm, said hook having spaced enlargements engaging with said lug to limit vertical movement of the hook in either direction with respect to said supporting element.

In testimony whereof, I affix my signature hereto.

FREEMAN A. QUINTAL.